United States Patent

Romann

[11] Patent Number: 5,921,473
[45] Date of Patent: Jul. 13, 1999

[54] FUEL INJECTOR HAVING SPHERICAL VALVE-CLOSURE MEMBER AND VALVE SEAT

[75] Inventor: Peter Romann, Stuttgart, Germany

[73] Assignee: Robert Bosch GmbH, Stuttgart, Germany

[21] Appl. No.: 08/684,027

[22] Filed: Jul. 19, 1996

[30] Foreign Application Priority Data

Jul. 25, 1995 [DE] Germany ............................ 195 27 049

[51] Int. Cl.[6] ................................................. F02M 59/00
[52] U.S. Cl. ................................... 239/533.2; 239/585.1; 239/900
[58] Field of Search ........................... 239/533.2, 533.12, 239/585.1–585.5, 900

[56] References Cited

U.S. PATENT DOCUMENTS

| 3,865,312 | 2/1975 | Lombard et al. ...................... 239/585.1 |
| 4,197,997 | 4/1980 | Wu et al. ......................... 239/533.12 X |
| 4,417,694 | 11/1983 | Claxton et al. ..................... 239/533.12 |
| 4,585,174 | 4/1986 | Knapp ................................... 239/585.1 |
| 4,830,286 | 5/1989 | Asslaender et al. .................. 239/585.3 |
| 5,161,743 | 11/1992 | Takeda et al. .................... 239/585.5 X |
| 5,163,621 | 11/1992 | Kato et al. ......................... 239/533.12 |
| 5,186,882 | 2/1993 | Hafner ................................. 239/900 X |
| 5,219,122 | 6/1993 | Iwanga .............................. 239/900 X |
| 5,255,855 | 10/1993 | Maier et al. ....................... 239/900 X |
| 5,533,482 | 7/1996 | Naitoh .............................. 239/585.1 X |

FOREIGN PATENT DOCUMENTS

| 37 10 467 | 12/1987 | Germany . |
| 36 40 830 | 6/1988 | Germany . |
| 43 07 159 | 9/1994 | Germany . |

Primary Examiner—Andres Kashnikow
Assistant Examiner—Steven J. Ganey
Attorney, Agent, or Firm—Kenyon & Kenyon

[57] ABSTRACT

In a fuel injector, a spherical valve-closure member interacts with an edge seat. The edge seat is formed by surfaces that follow one another directly at different angles in the area of the valve seat. The angles of the surfaces are such that the sealing edge of the edge seat points toward the valve-closure member. The fuel injector is especially suited for applications in fuel injection systems of mixture-compressing internal combustion engines having externally supplied ignition.

5 Claims, 3 Drawing Sheets

FUEL INJECTOR HAVING SPHERICAL VALVE-CLOSURE MEMBER AND VALVE SEAT

BACKGROUND OF THE INVENTION

German Published Unexamined Patent Application No. DE-OS 43 07 159 (see FIG. 1) describes a fuel injector having a spherical valve-closure member which interacts with a flat valve seat surface. In a design of this type, the engaging surface of the sphere is relatively broad in the seat area This is associated with disadvantageous hydraulic adhesive effects which are especially intensified when working with fuels such as ethanol.

Moreover, a fuel injector is described in German Published Unexamined Patent Application No. DE-OS 36 40 830, the valve needle of which has a sealing edge which interacts with a valve seat surface of a nozzle body. The sealing edge is realized by a transition from a cylindrical section to a tapered, conical section of the valve needle. For the most part, therefore, a linear contact exists between the valve needle, with its sealing edge, and the valve seat surface.

A fuel injector having a similar valve seat area is described in German Patent Application No. 37 10 467. The sealing seat of its valve needle is rounded off, however, so that there is no sharp-edged sealing edge. Thus, the cylindrical section of the valve needle changes continually into the conical section. The rounded off sealing seat leads only to a roughly linear contact, which, of course, is dependent upon the radius of the curvature.

SUMMARY OF THE INVENTION

The fuel injectors according to the present invention advantageously render possible a simple and cost-effective means for achieving an edge-type seating arrangement, when spherical valve-closure members are used in the fuel injectors. The edge seats are advantageous in so far as, given a closed valve (injector), there is effectively only one linear contact between the valve-closure member and the valve seat When the edge-type seating arrangements are used, there is no broadening of the seat-engaging surface area of the valve-closure member on the valve seat, even when fuels such as ethanol E22 or E100 are used. As a result, one necessarily avoids the negative, hydraulic, adhesive effects associated with a broadening of the seat-engaging surface area on the valve seat. This offers the advantage of a constant, dynamic spray-discharge volume $q_{dyn}$. over a long operational life, since the operating (pick-up) times are able to be kept constant.

It is especially advantageous for the edge-type seat or the sealing edge to be formed by two surfaces that follow one another in the direction of flow and exhibit an angular difference of >=10° to provide the edge seat or the sealing edge with a distinctly sharp-edged characteristic.

DETAILED DESCRIPTION

Figure 1:
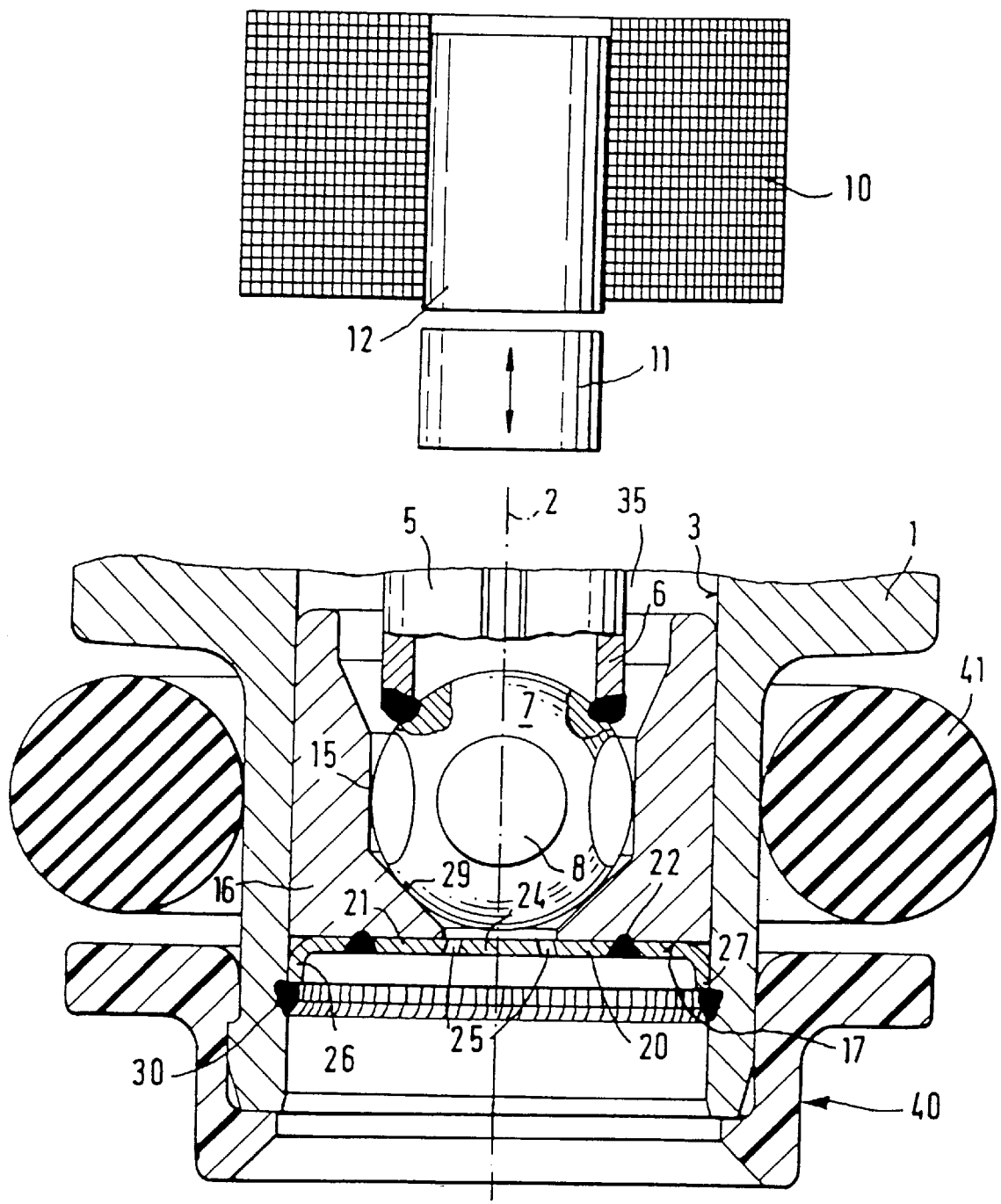
FIG. 1 shows a partial illustration of a known fuel injector with a spherical valve-closure member.

FIG. 1 is a partial view of a known valve in the form of an injector for fuel-injection systems of mixture-compressing internal combustion engines having externally supplied ignition. The injector has a tubular valve-seat support 1, in which a longitudinal opening 3 is formed concentrically to a longitudinal valve axis 2. Disposed in the longitudinal opening 3 is, e.g., a tubular valve needle 5, which is joined at its downstream end 6 to a spherical valve-closure member 7, on whose periphery are provided, e.g., five flattened areas 8.

As is generally known, the injector is actuated, e.g., electromagnetically. An electromagnetic circuit, which is sketched with a solenoid coil 10, an armature 11, and a core 12, is used to axially move the valve needle 5 and, thus, to open it opposite the spring resilience of a restoring spring (not shown) or to close the injector. The armature 11 is joined to the end of the valve needle 5 facing away from the valve-closure member 7 by, e.g., a laser-produced weld and aligned to the core 12. The solenoid coil 10 surrounds the core 12, which represents the end of an intake nipple (not shown in greater detail) surrounded by the solenoid coil 10, the intake nipple being used to supply the medium to be metered in by means of the valve.

A guide opening 15 of a valve-seat member 16 is used to guide the valve-closure member 7 during the axial movement. In the downstream end of the valve-seat support 1 facing away from the core 11, the cylindrical valve-seat member 16 is imperviously installed, by means of welding, in the longitudinal opening 3 running concentrically to the longitudinal valve axis 2. The circumference of the valve-seat member 16 has a slightly smaller diameter than the longitudinal opening 3 of the valve-seat support 1. At its one lower end face 17 facing away from the valve-closure member 7, the valve-seat member 16 is concentrically and permanently joined by way of a base part 20 to an, e.g., pot-shaped spray-orifice plate (aperatured spray disk) 21.

The valve-seat member 16 and the spray-orifice plate 21 are joined, e.g., by a circumferential and impervious first, e.g., laser-produced weld 22. Through this type of assembly, one avoids the danger of the base part 20 undergoing an undesirable deformation in its central region 24, in which are situated at least one, for example four, spray orifices 25 formed by means of erosion or punching.

Contiguous to the base part 20 of the pot-shaped spray-orifice plate 21 is a circumferential retention rim 26, which extends in the axial direction facing away from the valve-seat member 16 and is bent conically to the outside up to its end 27. The retention rim 26 exerts a radial spring action on the inner wall of the longitudinal opening 3. This prevents chips from forming on the valve-seat part and at the longitudinal opening 3 when the valve-seat part including the valve-seat member 16 and the spray-orifice plate 21 is inserted into the longitudinal opening 3 of the valve-seat support 1. At its end 27, the retention rim 26 of the spray-orifice plate 21 is joined to the inner wall of the longitudinal opening 3, e.g., by means of a circumferential and impervious second, e.g., laser-produced weld 30.

The insertion depth of the valve-seat part, comprised of the valve-seat member 16 and the pot-shaped spray-orifice plate 21, in the longitudinal opening 3 determines the size of the lift of the valve needle 5, since given an unexcited solenoid coil 10, the end position of the valve needle 5 is determined by the seating of the valve-closure member 7 on a valve-seat surface 29 of the valve-seat member 16. Given an excited solenoid coil 10, the other end position of the valve needle 5 is determined by the seating of the armature 11 on the core 12. Therefore, the path between these two end positions of the valve needle 5 represents the lift.

The spherical valve-closure member 7 interacts with the valve-seat surface 29 of the valve-seat member 16 that is tapered frustoconically in the direction of flow, the valve-seat surface 29 being formed in the axial direction between the guide opening 15 and the lower end face 17 of the valve-seat member 16.

In order for the flow of the medium coming from an inner valve space 35 to also attain the spray orifices 25 of the spray-orifice plate 21, five flattened areas 8 are introduced on the periphery of the spherical valve-closure member 7. To exactly guide the valve-closure member 7 and, thus, the valve needle 5 during the axial movement, the diameter of the guide opening 15 is formed so as to allow the spherical valve-closure member 7, outside of its flattened areas 8, to project through the guide opening 15 with a small radial clearance.

A protective cap 40 is arranged on the periphery of the valve-seat support 1, at its downstream end facing away from the solenoid coil 10, and is joined, for example, by means of a snap-in locking connection to the valve-seat support 1. A sealing ring 41 is used to seal off between the periphery of the injector and a valve mount (not shown), for example the intake line of the internal combustion engine.

When working with this known fuel injector, the valve-closure member 7 forms a relatively broad seating area that engages on the valve-seat surface 29, which leads to an undesirable adhesive effect when the valve opens. Starting from the basis of a fuel injector according to FIG. 1, for example, FIGS. 2 and 3 show two exemplary embodiments according to the present invention of fuel injectors, only the regions around the spherical or sphere-like valve-closure member 7 being enlarged in the illustration.

Figure 2:
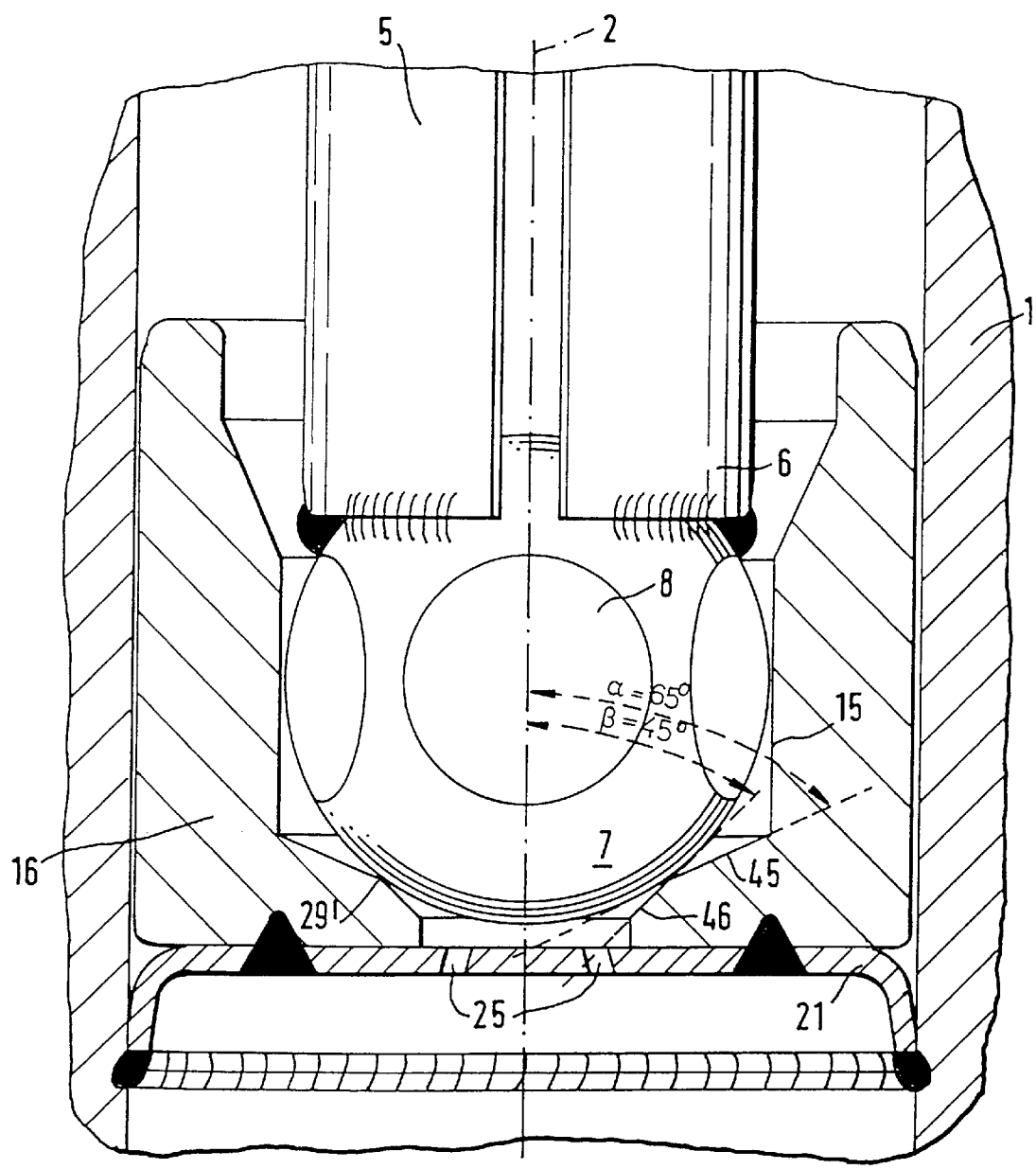
FIG. 2 shows a first exemplary embodiment of an edge seat according to the present invention.

In the exemplary embodiment in FIG. 2, instead of the flat, frustoconically running valve-seat surface 29, the valve-seat member 16 has two flat surfaces 45 and 46, which are likewise tapered frustoconically in the direction of flow, but run at different angles from the longitudinal valve axis 2 and, therefore, form an annular edge-type seating 29' at their point of contact. The upper surface 45 facing the end 6 of the valve needle 5 has a smaller rise than the lower surface 46 situated downstream and facing the spray-orifice plate 21, which means, in turn, that a larger angle α exists than the angle β between the lower surface 46 and the longitudinal valve axis 2. The angle α between the surface 45 and the longitudinal valve axis 2 amounts, e.g., to 65° and the angle β between the surface 46 and the longitudinal valve axis 2, e.g., to 45°. These angular specifications are merely provided as examples and in no way restrict the scope of the present invention. Thus, it is perfectly feasible for the two surfaces 45 and 46 to run at different angles. An amount of at least >=10° can be provided as the angular difference between α and β, in order to also effectively obtain a sharp-edged edge seat 29' between the surfaces 45 and 46. The 20° indicated in FIG. 2 proves to be the most favorable angular difference. By designing the valve-seat member 16 in this manner with the circumferential, annular edge seat 29', there is effectively only one linear contact, given a closed valve, between the spherical valve-closure member 7 and the edge seat 29'.

With this edge seat 29', it is achieved that there is no broadening of the seat-engaging surface area of the valve-closure member 7 on the valve seat, even when fuels such as ethanol E22 or E100 are used, but rather a linear sealing area is retained. As a result, one necessarily avoids the hydraulic, adhesive effects associated with a broadening of the seat-engaging surface area on the valve seat, particularly when working with ethanol as a fuel. This offers the advantage of a constant dynamic spray-discharge volume $q_{dyn}$ over a long operational life.

Figure 3:
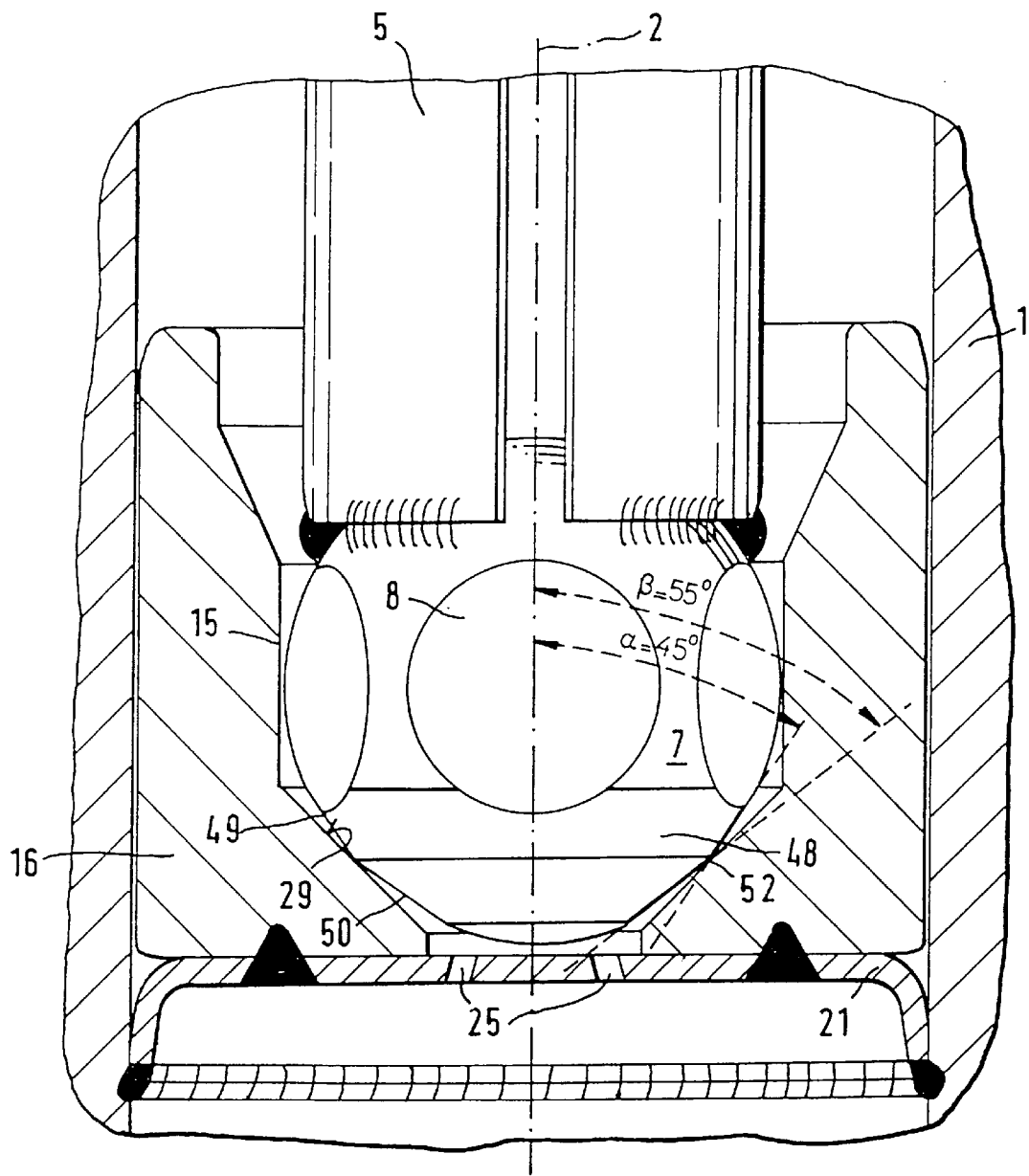
FIG. 3 shows a second exemplary embodiment of an edge seat according to the present invention.

The same positive effects are also attainable with an arrangement as shown in FIG. 3. Here, the flat valve-seat surface 29 has a frustoconical design with a constant angle. On the other hand, the valve-closure member 7 now merely has a sphere-like shape. At the height of the valve-seat surface 29, thus in its lower area 48 pointing toward the spray-orifice plate 21, the shape of the valve-closure member 7 deviates somewhat from a sphere. However, through the application of two oblique surfaces 49 and 50 with different angles, each encircling the periphery of the valve-closure member 7, a sharp-edged sealing edge 52 is attainable at their contact line. Thus, the valve-closure member 7 is chamfered, for example, to form an angle α of 45° between the upper oblique surface 49 and the longitudinal valve axis 2, and an angle β of 55° between the lower oblique surface 50 and the longitudinal valve axis 2. Here, again, other combinations of angles and angular differences are certainly feasible. In any case, the outside sealing edge 52 results from the angular difference between α and β, which, given a closed valve, ensures a linear contact between the valve-closure member 7 and the valve-seat surface 29.

What is claimed is:

1. A fuel injector for a fuel injection system of an internal combustion engine, the fuel injector having a longitudinal valve axis, comprising:

a spherical valve-closure member; and a valve seat, the valve-closure member interacting with the valve seat, at least one spray orifice being downstream from the valve seat, the valve seat having upstream and downstream surfaces, the upstream surface meeting the downstream surface to form an edge seat, a first angle between the upstream surface and the longitudinal valve axis being greater than a second angle between the downstream surface and the longitudinal valve axis, wherein:

each of the upstream and downstream surfaces has a constant slope over an entire circumference of the edge seat, each one of the first angle and the second angle is greater than 0° and less than 90°, and each one of the upstream surface and the downstream surface converges to the longitudinal valve axis along a downstream direction with respect to the longitudinal valve axis.

2. The fuel injector according to claim 1, wherein the first angle is at least 10° greater than the second angle.

3. The fuel injector according to claim 1, wherein the valve seat is cylindrical, the valve seat having a cylindrical guide opening for accommodating the spherical valve-closure member, the cylindrical guide opening being at least partially bordered by the upstream and downstream surfaces and the edge seat.

4. A fuel injector for a fuel injection system of an internal combustion engine, the fuel injector having a longitudinal valve axis, comprising:

a valve-closure member having a sphere-like shape, the valve-closure member having upstream and downstream oblique surfaces at a periphery of the valve-closure member, the upstream oblique surface meeting the downstream oblique surface to form a sealing edge, a first angle between the upstream oblique surface and the longitudinal valve axis being less than a second angle between the downstream oblique surface and the longitudinal valve axis; and a valve seat having a valve seat surface, the sealing edge interacting with the valve seat surface, at least one spray orifice being downstream from the valve seat.

5. The fuel injector according to claim 4, wherein the first angle is at least 10° less than the second angle.

\* \* \* \* \*